United States Patent Office 3,441,520
Patented Apr. 29, 1969

3,441,520
POLYMER OF 1,4-BIS-[TRIS-(NF$_2$)METHOXY] 2-BUTENE OXIDE
David S. Bosniack, New York, N.Y., and Eugene L. Stogryn, Fords, and Joel G. Berger, Elizabeth, N.J., assignors to Esso Research and Engineering Company, a corporation of Delaware
No Drawing. Filed July 29, 1964, Ser. No. 386,087
Int. Cl. C08f 13/00
U.S. Cl. 260—2                                                6 Claims This invention relates to the synthesis of solid polymers from 1,4-bis-[tris-(NF$_2$)methoxy]-2-butene oxide by the use of certain catalysts, such as particularly antimony pentachloride and antimony pentafluoride, which make the preparation efficient and make the solid polymer product more valuable, especially for use in solid rocket propellant formulations. It is concerned with providing such solid polymers of high melting points and which show crystallinity.

The high-energy epoxide monomer used for the polymerization contains one NF$_2$ group per carbon atom and has the structural formula:

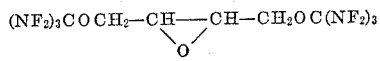

This compound is referred to herein as FABDE. It is the fluorinated perfluoroguanidine adduct of 1,4-dihydroxy-2-butene oxide, either as the cis or trans isomer. The preparation of the monomeric FABDE and various ways in which it is polymerized or modified more generally, are described in U.S. application Ser. No. 386,088 filed by E. L. Stogryn, J. G. Berger and L. J. Engel on July 29, 1964. The synthesis route for obtaining FABDE is given as follows:

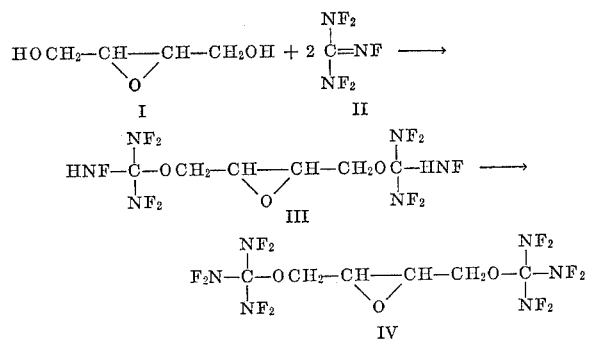

In the synthesis, the starting reactant I is 1,4-dihydroxy-2-butene oxide. The perfluoroguanidine reactant is II, and the adduct is III, and the fluorinated adduct is IV.

The cis isomer of 1,4-dihydroxy-2-butene oxide is prepared by epoxidation of commercially available cis 1,4-dihydroxy-2-butene. Using the cis isomer as the reactant I, the preparation of IV, in which the substituents on the epoxide ring are cis, is described in the following example.

Example 1.—Preparation of cis 1,4-bis-[tris-(NF$_2$) methoxy]-2-butene oxide

A pressure reactor was charged with 2.52 g. of cis-1,4-dihydroxy-2-butene oxide, 0.168 g. urea, 30 ml. of acetonitrile, and 12 g. of perfluoroguanidine. The reaction was stirred at room temperature overnight. After removal of the unreacted gases a 35% F$_2$/N$_2$ stream was passed over the surface of the acetonitrile solution for 4.5 hours. During the fluorination the temperature in the reactor was maintained at $-25°$ C.

After stripping off the acetonitrile the viscous residue was dissolved in Freon 113 or CCl$_4$ and dried with anhydrous Na$_2$CO$_3$. The solution was filtered and the solvent blown off. The residue was placed on a silica gel column (the silica gel had previously been treated with caustic, H$_2$O, and dried at 600° F. for 6 hours) with a minimum amount of CCl$_4$. Elution with CCl$_4$ gave 7.9 g. (74% yield) of cis-1,4-bis[tris-(NF$_2$)methoxy]-2-butene oxide having a purity of 96+%.

Calculated for C$_6$H$_6$O$_3$N$_6$F$_{12}$: C, 16.45; N, 19.18; F, 52.03. Found: C, 16.88; N, 19.31; F, 53.30.

The trans isomer of I was prepared by the basic hydrolysis of commercially available trans 1,4-dichloro 2-butene followed by epoxidation.

To make the product IV having a trans structure from the trans isomer of compound I, the procedure described in Example 2 was followed.

Example 2.—Trans-1,4-bis-[tris(NF$_2$)methoxy]-2-butene oxide

A pressure reactor was charged with 0.45 g. of trans-1,4-dihydroxy-2-butene oxide, 0.026 g. of urea, 6 ml. of acetonitrile and 1.788 g. of perfluoroguanidine. The reaction mixture was stirred at room temperature overnight. After removal of the unreacted gases a 10% F$_2$/N$_2$ stream was passed over the surface of the reaction mixture for 2 hours at 0° C.

Working up the reaction product in a manner similar to what was described in Example 1 yielded 1.4 g. (74%) of trans-1,4-bis-[tris(NF$_2$)methoxy]-2-butene oxide having a purity of >90%.

Calculated for C$_6$H$_6$O$_3$N$_6$F$_{12}$: C, 16.45; N, 19.18; F, 52.03. Found: C, 16.95; N, 19.17; F, 53.4.

The infrared and proton spectrum are consistent with the structure IV in the trans configuration.

The high NF$_2$ content (71%) and the reaction properties of the epoxide function in the FABDE monomer adapts it for use as a liquid energetic oxidizer or as an intermediate in the synthesis of useful solid polymers that are suitable components for advanced solid propellant formulations. In making the high NF$_2$ content epoxides and in polymerizing these epoxides, it is important to preserve the NF$_2$ content of the resulting polymers and to make the polymerization to take place in such a manner as to produce consistent polymers having the base properties with respect to thermal stability, compatibility with other propellant components, good handling characteristics and desired solid characteristics such as crystallinity, and uniform high melting point.

Other solid NF$_2$ oxidizers, based on perfluoroguanidine chemistry which are energetically close to FABDE polymers are known. However, as the following Table I illustrates, none of these NF$_2$ oxidizers is as good as poly-FABDE.

TABLE I

| | Poly-FABDE | FA-NG [1] | Info-635 [2] | FA-PO [3] | Tetryl [4] |
|---|---|---|---|---|---|
| Vacuum thermal stability, cc./g./100 hours at 90° C | 2.3 | 4.0 | 10.3 | 6.7 at 60° C | |
| Impact sensitivity, Kg-cm | 35 | 5 | 15 | <2.5 | 33 |
| Thermogravametric analysis, ° C. for wt. loss to start | >150 | 84 | 191 | 75–100 | |
| Auto-ignition temperature, ° C | 253 | 234 | 231 | 219 | 249 |

[1] [(NF$_2$)$_3$COCH$_2$]$_3$CNO$_2$.
[2] (NF$_2$)$_3$COCH$_2$CH$_2$NH$_3$⊕ClO$_4$⊖.
[3] [(NF$_2$)$_3$COCH$_2$]$_3$PO.
[4] Commercial explosive (non-NF$_2$).

In accordance with the present invention a significant discovery and advance in the development of solid FABDE polymers was made in finding that the halides of antimony, in particular antimony pentachloride and antimony pentafluoride, are uniquely superior to other catalysts for the polymerization of FABDE monomers to solid polymers. Using these catalysts, methods were also devised for controlling the steric regularity of polymerization. The degree of orderliness or regularity of the ring opening polymerization, catalyzed by the antimony halides, is discernible by chemical and instrumental techniques, e.g., solubility and powder X-ray diagrams. The following examples illustrate the technique we have developed for controlling the degree of conversion to solid polymer and the degree of crystallinity of the solid polymer.

EXAMPLE 3

The cis FABDE monomer of at least 96% purity was charged in an amount of 0.80 g. into Freon 113 ($F_2CCl$—$CCl_2F$) to obtain a 25% solution of the monomer in the solvent. The $SbCl_5$ catalyst was added in proportions of 0.4 mole percent, based on the monomer in the solution which was cooled to $-22°$ C. in a reactor. The solution containing the admixed catalyst was stirred for one hour, then the polymerization mixture was allowed to stand for 18 hours at $-22°$ C.

The final polymerization mass was allowed to warm up to 25° C. the solvent was pumped off and the polymer oils were separated from polymer solids by extracting the oils with small portions of methylene chloride. After vacuum drying the solid polymer, a white powder was obtained and analyzed. The white powder had melting points in the range of 198° to as high as 207° C.

The cis FABDE monomer gave solid polymer by this procedure in conversions as high as 85 to 90%. This polymer is soluble in Freon 113 and has a degree of crystallinity of 1 to 5% by X-ray measurements.

The following is a typical chemical analysis:

TABLE II

| Analysis: | Theory | Found |
|---|---|---|
| Percent C | 16.45 | 15.82 |
| Percent N | 19.18 | 19.44 |
| Percent F | 52.03 | 52.8 |

The solid polymer is shown by analysis to have a composition of the recurring monomeric unit:

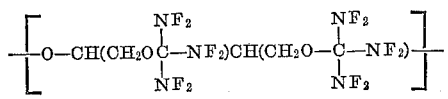

Examples 4–7.—Influence of solvent and catalyst concentration

Of the solvents used, the Freon type, Freon 113, were found most satisfactory on account of their solvent action on the monomer, catalyst and products and in the separation steps, although the $SbCl_5$ and $SbF_5$ can be used with other kinds of solvents such as $CH_2Cl_2$, liquid $SO_2$, low boiling aliphatic hydrocarbons, etc. In the studies of the activity of the $SbCl_5$ and $SbF_5$ catalyst during polymerization of the FTBDE monomer, it was observed that low catalyst concentrations tend to favor the formation of the desired solid polymers as shown in the following results:

TABLE III

| Example: | Mole percent, SbCl₅ | °C. | Percent Freon | Percent Solids | M.P., °C. |
|---|---|---|---|---|---|
| 4 | 0.4% | −22 | 75 | 74.7 | 199–200.5 |
| 5 | Two additions 0.4% each | −22 | 50 | 67.7 | 200–202 |
| 6 | Three additions 0.4% each | −22 | 75 | 56.8 | 198–200 |
| 7 | 2% in one slug | 0 | 50 | 52.0 | 192–195 |

Examples 8–10.—No solvent polymerization

The FABDE monomer was charged to a polymerization vessel and sealed with a serum cap and placed in a 0° C. bath. While the monomer was stirring the catalyst was injected through the serum cap with a hypodermic needle and the polymerization was allowed to proceed for the time period described in Table IV.

TABLE IV

| Ex. | Monomer | Catalyst, Mole percent | Time, Days | Percent Yield | M.P., °C. | X-ray, percent Crystallinity |
|---|---|---|---|---|---|---|
| 8 | cis-FABDE | SbCl₅, 2 | 1 | 57.6 | 202–203 | 23 |
| 9 | do | SbF₅, 2 | 1 | 24 | 204–206 | 33 |
| 10 | trans-FABDE | SbCl₅, 2 | 3 | 67 | 200–202 | 26 |

Studies have shown that the solid polymers of FABDE may be mixed with other propellant ingredients such as $NF_2$-containing liquid organic plasticizers, e.g., hexakis ($NF_2$)dipropyl ether, powdered metal fuels such as boron, aluminum, various inorganic oxidizers such as ammonium perchlorate, hydrazine diperchlorate, and other substances which may have a protective coating such as lithium and nitronium perchlorate. Formulations using the solid polymers of FABDE has Isp values in the range of 290 to above 305 with the advantage that the solid polymer can be present in a high proportion as shown in the following formulations with solid FABDE polymer:

| Component | Wt. percent | Isp |
|---|---|---|
| Solid FABDE | 58.74 | |
| Liquid (NF₂)₃COCH₂C(NO₂)₃ | 35 | |
| Boron | 6.26 | 305.7 |

There is an advantage in being able to use a large amount of solid polymer as binder to increase the strength of the propellant composite, however, even the liquid FABDE polymers may be used to a certain extent for blending and filling in voids between solid particles. The solid polymers showing crystallinity tend to form binders of higher tensile strength and to form composites of slower burning rate.

The invention described is claimed as follows:

1. A method of preparing crystalline solid polymers of 1,4-bis[tris - ($NF_2$)methoxy]2 - butene oxide monomer which comprises polymerizing said monomer with a catalytic action of a catalyst selected from the group consisting of $SbCl_5$ and $SbF_5$.

2. The method as described in claim 1 in which the monomer is polymerized in a polyfluoroalkyl chloride solvent.

3. The method of claim 1, in which the monomer is polymerized free of solvent.

4. The method of claim 1, in which the monomer polymerized is a cis isomer.

5. The method of claim 1, in which the monomer polymerized is a trans isomer.

6. Solid polymer of 1,4 - bis - [tris-($NF_2$)methoxy]2- butene oxide having the composition of the recurring monomeric unit:
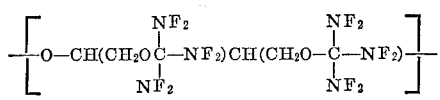
with melting points above 192° C. and showing X-ray crystallinity.
References Cited
Hoffman et al.: Chem. Reviews, vol. 62, pp. 12–18 (1962).
LELAND A. SEBASTIAN, *Primary Examiner.*
U.S. Cl. X.R.
149—19, 20, 22, 44; 260—348, 584